UNITED STATES PATENT OFFICE.

ANDREW J. HANLON, OF COLUMBUS, INDIANA, ASSIGNOR OF ONE-FOURTH TO WILLIAM W. DENISON AND ONE-FOURTH TO WALLACE B. DENISON, OF COLUMBUS, INDIANA.

WELDING COMPOUND.

No. 865,887.  
Specification of Letters Patent.  
Patented Sept. 10, 1907.

Application filed June 28, 1907. Serial No. 381,322.

*To all whom it may concern:*

Be it known that I, ANDREW J. HANLON, a citizen of the United States, residing at Columbus, in the county of Bartholomew and State of Indiana, have invented a new and useful Welding Compound, of which the following is a specification.

This invention relates to a composition of matter, the object of which is to produce a flux or like combination for the purpose of welding cast iron and steel to itself or to other metals such as silver, copper, etc., and to firmly and strongly weld together any metals desired.

For the purpose of making the welding compound, the following ingredients are first pulverized and then thoroughly mixed dry, in about the following proportions:

| | |
|---|---|
| Borax | 6 ounces. |
| Carbonate soda | 3 " |
| Glass | 3 " |
| Oxid of iron | 3 " |
| Rosin | 1 ounce. |

The metals to be welded are cleaned and heated, the compound being sprinkled on them in the shape of powder while heating. The action of the borax, soda and rosin together tend to create an even heat throughout the piece to be welded. The glass is employed to keep the metals from running, while the oxid of iron possesses the property of making the joint hold, or in other words a perfect weld.

Having thus described the invention, what is claimed is:—

1. A welding compound consisting of borax, carbonate of soda, powdered glass, oxid of iron and rosin.

2. A welding compound consisting of the following ingredients pulverized and intimately mixed in the proportions hereabove described, borax, carbonate of soda, powdered glass, oxid of iron and rosin.

In testimony that I claim the foregoing as my own, I have hereto affixed my signature in the presence of two witnesses.

ANDREW J. HANLON.

Witnesses:
  ROSS DENISON,
  PEARL DENISON.